United States Patent [19]

Benkmann

[11] 4,299,596
[45] Nov. 10, 1981

[54] ADSORPTION PROCESS FOR THE SEPARATION OF GASEOUS MIXTURES

[75] Inventor: Christian Benkmann, Munich, Fed. Rep. of Germany

[73] Assignee: Linde Aktiengesellschaft, Wiesbaden, Fed. Rep. of Germany

[21] Appl. No.: 764,508

[22] Filed: Feb. 1, 1977

[30] Foreign Application Priority Data

Feb. 4, 1976 [DE] Fed. Rep. of Germany ....... 2604305

[51] Int. Cl.³ ............................................ B01D 53/04
[52] U.S. Cl. .......................................... 55/26; 55/58; 55/62; 55/74
[58] Field of Search ................... 55/25, 26, 58, 62, 68, 55/74, 75

[56] References Cited

U.S. PATENT DOCUMENTS

| 2,918,140 | 12/1959 | Brooks | 55/58 |
| 3,086,339 | 4/1963 | Skarstrom et al. | 55/26 |
| 3,102,013 | 8/1963 | Skarstrom | 55/62 X |
| 3,150,942 | 9/1964 | Vasan | 55/62 X |
| 3,176,444 | 4/1965 | Kiyonaga | 55/58 X |
| 3,252,268 | 5/1966 | Stark | 55/58 X |
| 3,719,025 | 3/1973 | Heinze et al. | 55/58 X |
| 3,989,484 | 11/1976 | Hamrin, Jr. et al. | 55/58 |

Primary Examiner—Robert H. Spitzer
Attorney, Agent, or Firm—Millen & White

[57] ABSTRACT

For the separation of gaseous mixtures:
(a) passing a feed gas containing components A and B successively through two adsorption beds selected for component A to evolve an adsorption front of component A proximate the outflow end of the first adsorption bed, discharging an A-free product gas from the second adsorption bed, then interrupting the passing of the feed gas;

(b) lowering the pressure of both adsorption beds in the adsorption direction so that proportions of unadsorbed component A are withdrawn from said first adsorption bed, and said proportions from the first adsorption bed are adsorbed in the second adsorption bed, and withdrawing an A-free gas from the second adsorption bed;

(c) at the pressure of step (b), conducting a further gaseous mixture in the adsorption direction through both adsorption beds, the partial pressure of component A in said further gaseous mixture being equal to or higher than in the feed gas, interrupting the feeding of said further gaseous mixture before the breakthrough of component A through the second adsorption bed, and withdrawing an A-free gas from said second adsorption bed;

(d) disconnecting both adsorption beds from one another; expanding the first adsorption bed loaded with component A to recover component A; expanding the second adsorption bed, partially loaded with component A countercurrently to the adsorption process and passing a purge gas countercurrently through the expanded second adsorption bed to desorb component A; and (e) reconnecting both adsorption beds and repeating step (a).

21 Claims, 8 Drawing Figures

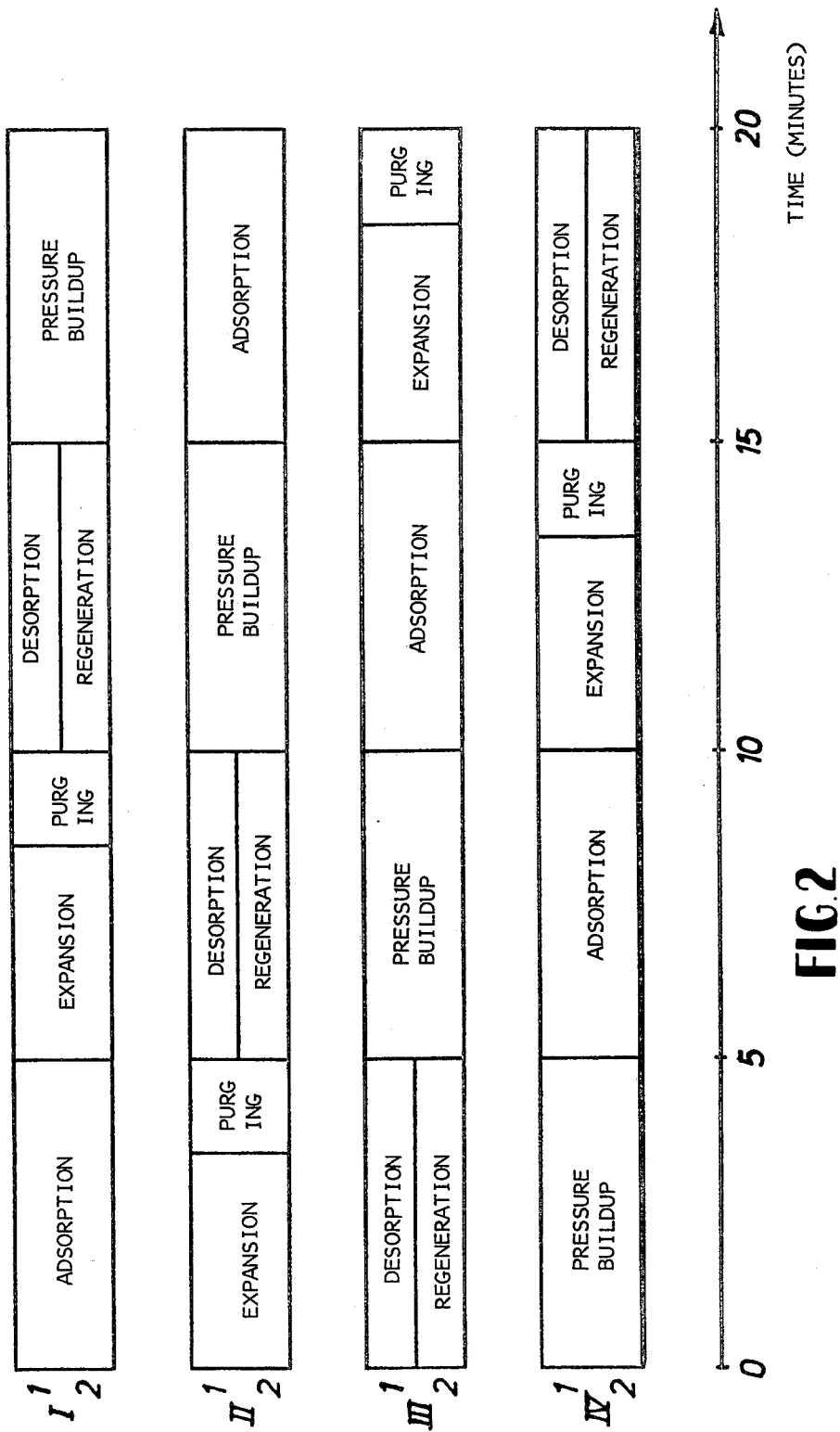

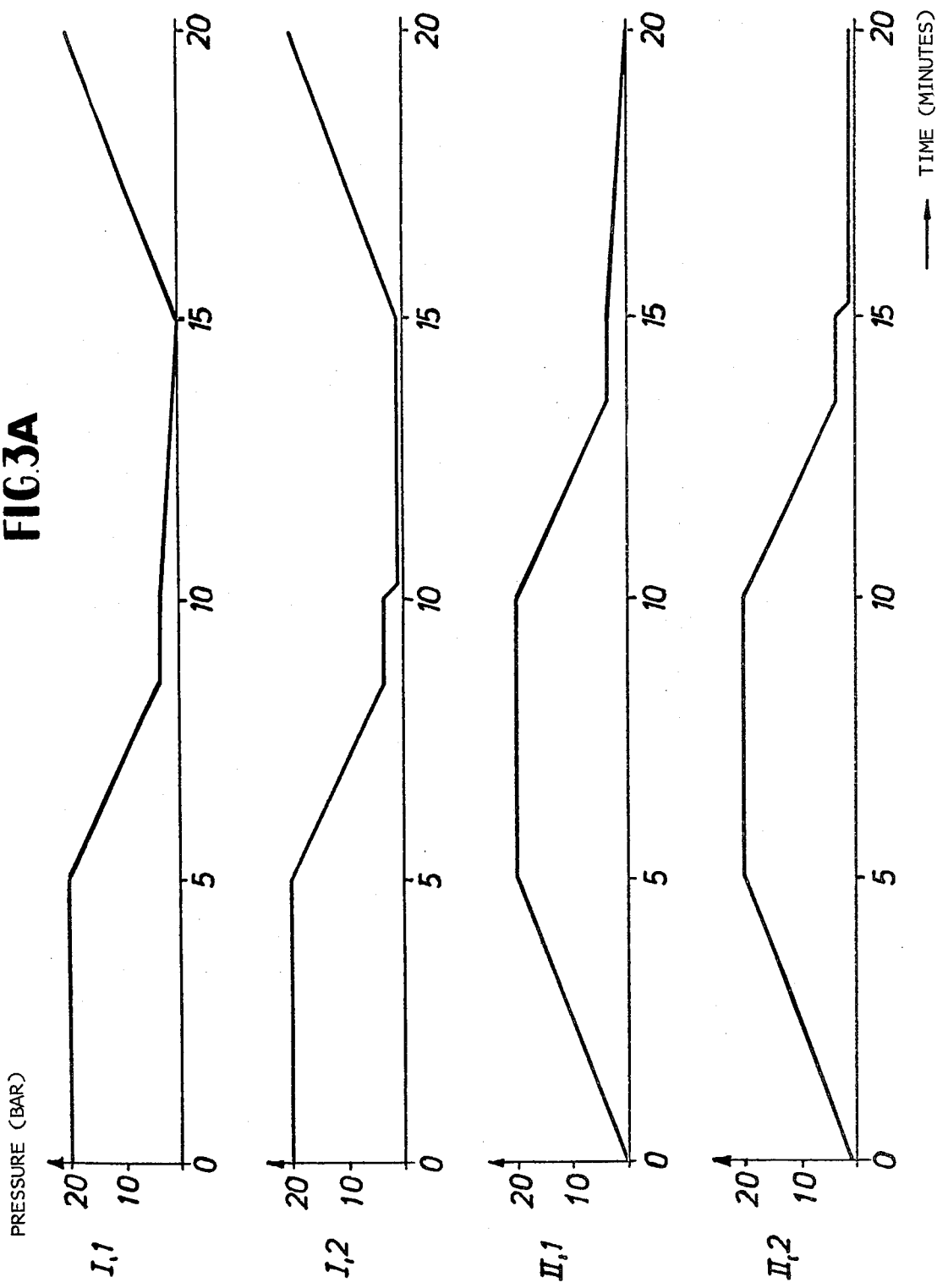

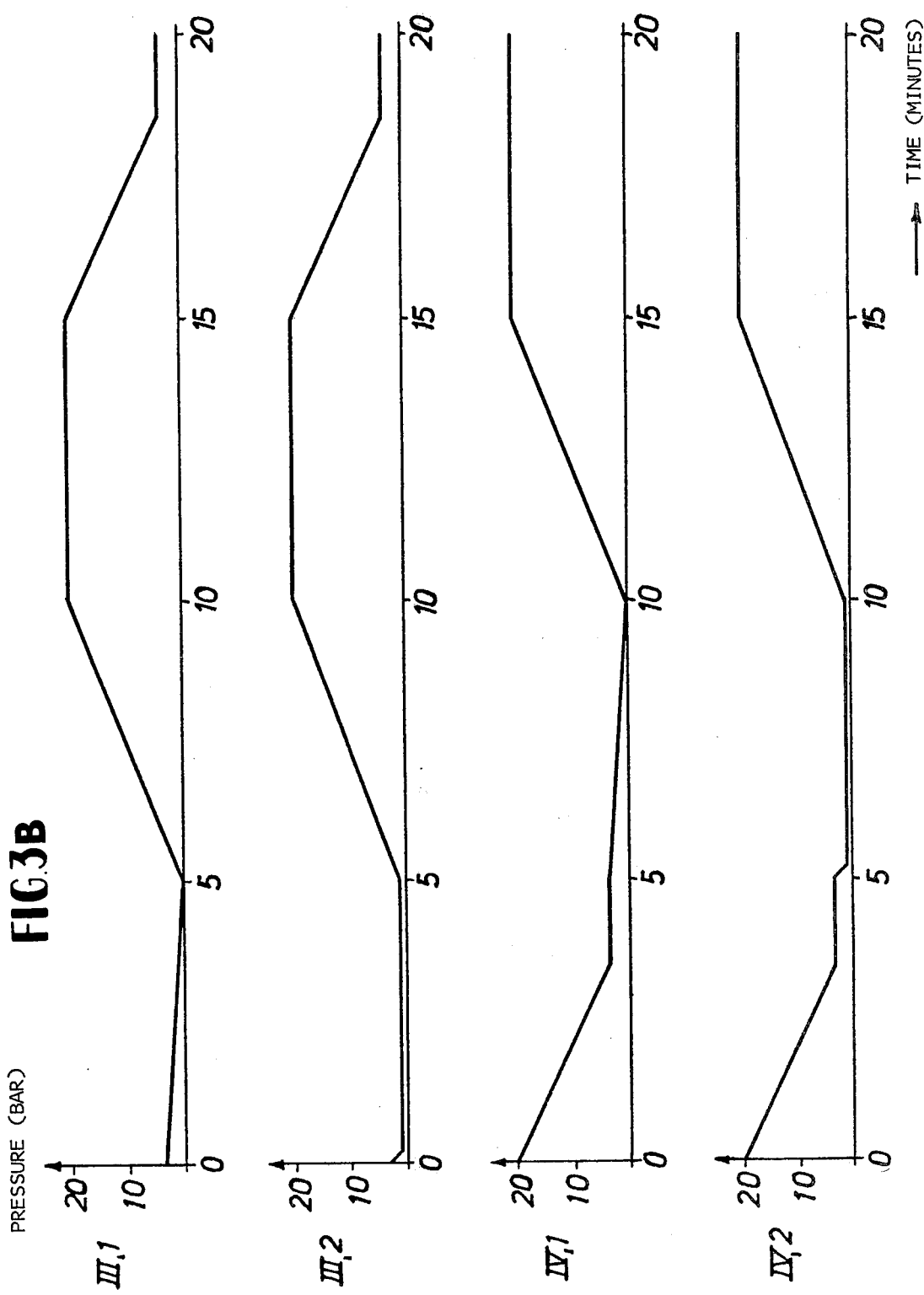

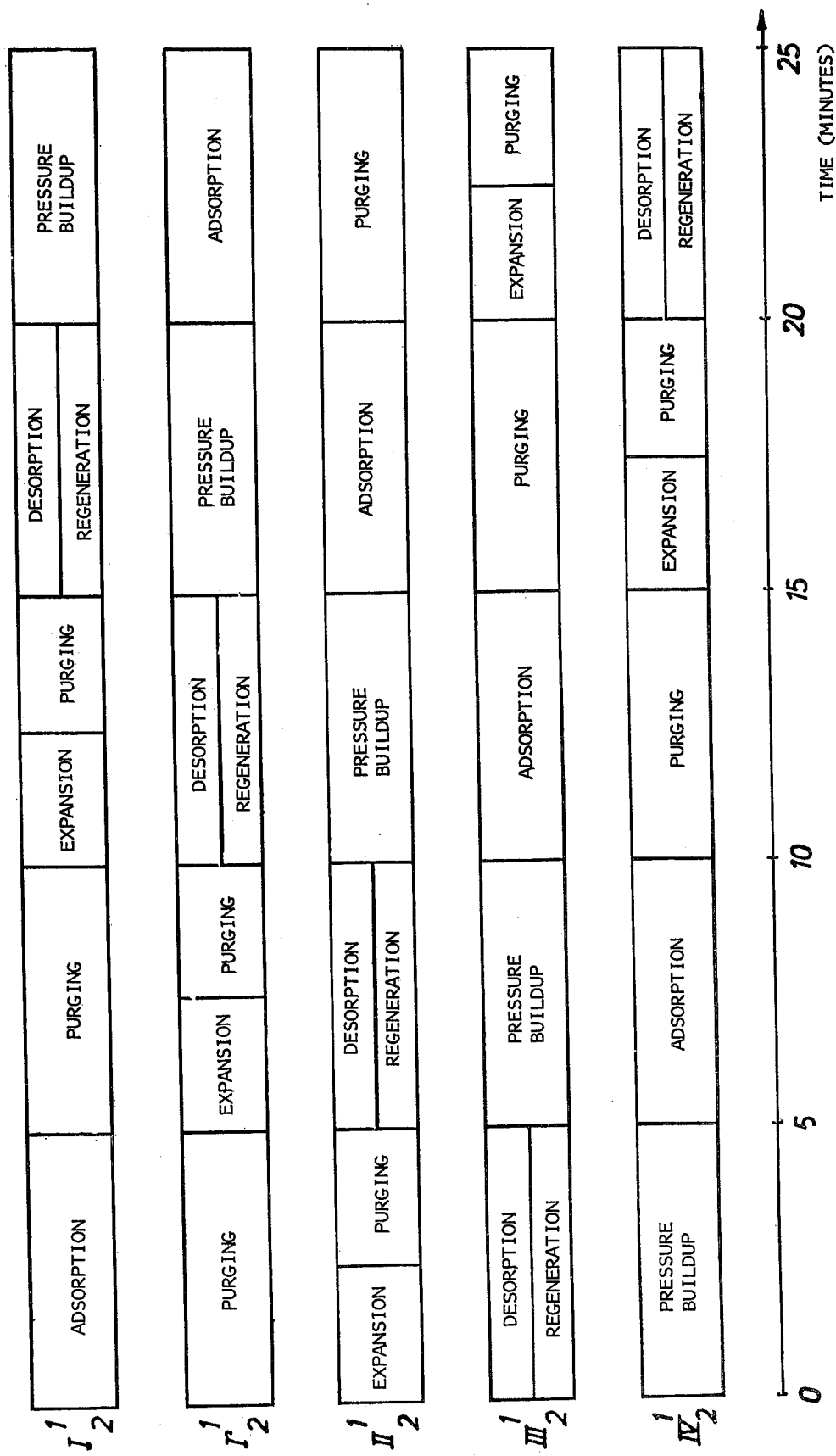

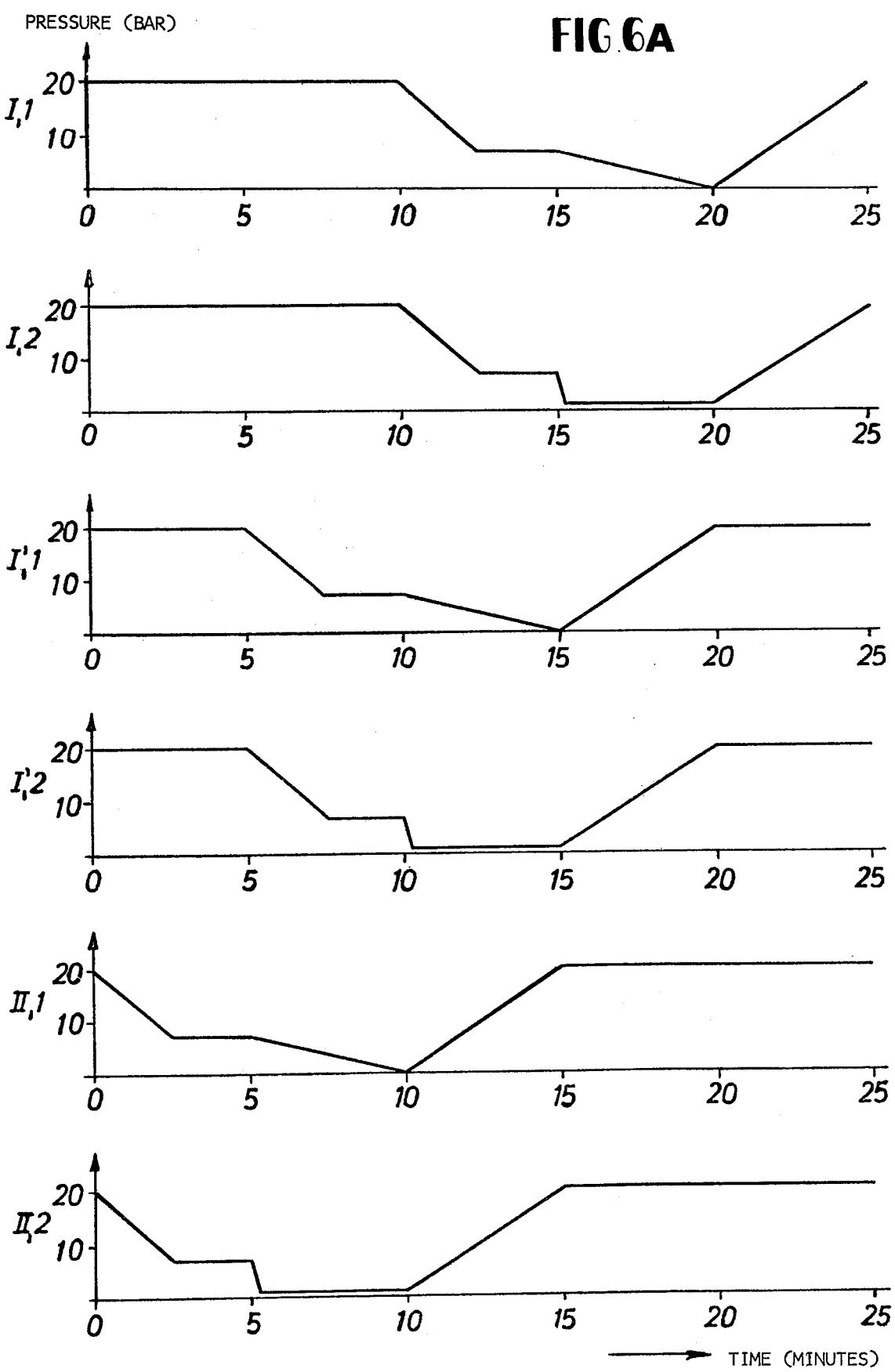

ADSORPTION PROCESS FOR THE SEPARATION OF GASEOUS MIXTURES

BACKGROUND OF THE INVENTION

This invention relates to a selective adsorption process for the separation of gaseous mixtures and in particular wherein a component A of a gaseous mixture is selectively adsorbed compared to a component B whereby a gas enriched in component B is recovered from the adsorption bed, and whereafter the pressure in the adsorption bed is lowered enabling the withdrawal of a gas enriched in component A, the adsorbent being thereby regenerated per se or by further measures.

A process of this type is known from U.S. Pat. No. 3,085,379. This conventional method is directed specifically to the removal of traces of air from helium wherein the helium losses are minimized by recycling a portion of the previously adsorbed components to the feed gas so that the concentration of adsorbable components is increased in the feed gas to obtain a higher loading of the adsorbent as well as a return of desired product into the gas cycle.

However, if this conventional process were to be applied to gaseous mixtures where the objective is not to remove an impurity component by adsorption but rather to obtain at least two components from a gaseous mixture in a maximally pure condition as well as in a maximally quantitative yield, then the conventional process would be inadequate, since it serves merely the purpose of completely removing a component present in relatively minor concentrations from a gas while tolerating more or less large losses of the other, primary component.

SUMMARY OF THE INVENTION

An object of this invention is to provide an adsorption process for separating gaseous mixtures into at least two components in a purity and in a yield not attainable by means of said conventional process.

Upon further study of the specification and appended claims, further objects and advantages of this invention will become apparent to those skilled in the art.

These objects are achieved in accordance with the invention by the combination of the following process steps:

(a) the feed gas mixture flows successively through two adsorption beds until the evolving adsorption front of component A has reached the outflow end of the first adsorption bed or has only insubstantially penetrated into the second adsorption bed, wherein an A-free product gas is discharged from the outflow end of the second adsorption bed, after which the feeding of the feed gas mixture to the first adsorption bed is interrupted;

(b) both adsorption beds are expanded in the adsorption direction, so that proportions of component A degasified from the first adsorption bed are adsorbed in the second adsorption bed and an A-free gas flows out of the second adsorption bed;

(c) at the same pressure as in step (b), a further gaseous mixture is conducted in the adsorption direction through both adsorption beds, the partial pressure of component A in this further gaseous mixture being equal to or higher than in the feed gas, wherein the feeding of gas is interrupted before the breakthrough of component A through the second adsorption bed and an A-free gas is obtained in this way;

(d) both adsorption beds are separated from each other, and the first adsorption bed, presently loaded only with component A, is expanded to obtain this component A, and the second adsorption bed, only partially loaded with component A, is expanded countercurrently to the adsorption and is charged with a purging gas for desorbing component A and/or for regenerating purposes;

(e) both adsorption beds are again connected with each other and brought to the adsorption pressure.

Thus, in the process of this invention, an adsorption unit subdivided into two series-connected adsorption beds is first charged with the feed gas mixture until the first adsorption bed is almost saturated with the preferably adsorbed gaseous component or has only unsubstantially penetrated into the second adsorption bed, which can be readily determined from an increase of the concentration of this component in the connecting conduit between the first and second adsorption beds or at a measuring point located at the end of the first adsorption bed. In the present process the first adsorption bed is regarded to be saturated, when at least 80%, preferably 95 to 98% of its adsorption capacity is reached. Any proportions of the preferably adsorbed component A which may break through the first adsorption bed are insignificant, since they are readily retained by the uncharged second adsorption bed. In any case, it is preferred that not more than 20%, especially not more than 10% of the total adsorption capacity for component A in the second adsorption bed be utilized during the first step. From the end of the second adsorption bed, a gas is discharged which is free of component A and which, in case of a gaseous mixture comprising only components A and B, already represents the pure product B.

In the subsequent switching phase, the pressure is lowered in both adsorption beds, namely by way of the outflow end of the second adsorption bed, i.e. in the adsorption direction. Due to the expansion, gases from the free volume of the first adsorption bed primarily pass over into the second adsorption bed. Insofar as proportions of component A are involved, these are detained in the second adsorption bed which still is almost entirely uncharged. As a consequence, gas which is likewise entirely free of A exits from the second adsorption bed. This gas can either be conducted to a product storage tank or can be used in other adsorption beds for purging or restoring the pressure. It is obvious that the more the pressure is lowered, the more gas will pass from the empty spaces into the second adsorption bed. However, if the pressure has reached the partial pressure of component A in the feed gas mixture, then a desorption of the previously adsorbed component A will begin, which is to be avoided if at all possible. Consequently, a reduction of the pressure during this switching phase to the partial pressure of component A in the feed gas mixture represents the lowest pressure for the expansion step, unless one is willing to tolerate grave disadvantages.

As soon as the pressure level has dropped to the desired value, a gas is conducted through both adsorption beds from the inlet side of the first adsorption bed; this gas can have an arbitrary composition and must merely fulfill the requirement with respect to component A that its partial pressure must be equal to or higher than the partial pressure of the same component in the feed gas mixture, in order to displace component B from the gas space. Preferably the partial pressure is at least 95% of the partial pressure of component A in the feed gas mixture, up to 130%, preferably 100 to 110%.

Of course, a suitable gas appears to be the product component A obtained in a switching phase which will be described hereinbelow, which certainly satisfies this requirement. However, precisely in case product A is utilized in this switching phase, it is advantageous to lower the pressure of the preceding expansion to approximately, e.g., not more than 30, preferably 0 to 10% above, the partial pressure of component A in the feed gas mixture, since only in this way it is possible to keep the consumption of component A from the product gas at a minimum while simultaneously fully charging the first adsorption bed with this component. However, if another gaseous mixture from the process is used for this step, it is unnecessary to lower the pressure to such an extent. Rather, it is advantageous to maintain the pressure at a maximally high value since this also means that the partial pressure of component A in this gaseous mixture is increased, resulting in a higher charge of the first adsorption bed with component A.

The introduction of this gas wherein the partial pressure of component A is equal to or higher than in the feed gas is terminated prior to the point in time at which the adsorption front of component A forming in the second adsorption bed has reached the end of this bed, preferably when the second adsorption bed is about 60 to 90, especially 80 to 95% saturated with component A. This can readily be determined by arranging suitable measuring points within the adsorption bed.

In the final analysis, after this process step has been completed, a first adsorption bed is present which is loaded with component A up to the saturation limit and contains only negligible traces of a component B and/or any additional components; and a second adsorption bed is present, the inlet side of which is extensively saturated with component A while the outflow side thereof is entirely free of component A.

If a gaseous mixture contains still further components, in addition to the two components A and B, the adsorbabilities of which lie between those of components A and B, then the possibility is provided to extensively fractionate the gaseous mixture at this point of the process. For the adsorption fronts of these further components move in front of the adsorption front of the component A, depending on the degree of their adsorbability. Thus, it is possible for example to discharge the most readily desorbable component of these components already during the expansion step from the outflow end of the second adsorption bed, and to remove the component which is in second place with regard to its desorbability, for example, only by the use of a purging gas and the thus-produced displacement desorption of the more readily desorbable component by component A. In this way, the process of this invention also makes it possible to separate gaseous mixtures which even consist of three or more components extensively into their individual constituents.

According to the invention, the two adsorption beds are now separated from each other. The first bed is expanded to obtain the product component A, optionally with the aid of a vacuum pump to subatmospheric pressure. The question whether the expansion takes place concurrently or countercurrently with respect to the adsorption is of subordinate importance. However, the expansion of the second adsorption bed always takes place in a direction opposite to the adsorption, i.e. by way of the fully loaded end of this adsorption bed, in order to avoid an unnecessary contamination of the free end, which would be the case in a cocurrent desorption. The thus-liberated gas is either discharged as residual gas and utilized in certain types of heating units, or, as will be explained further below, is utilized for a special purpose. The thus-completed regeneration of this adsorption bed can be further enhanced by the introduction of a purging gas.

After the extensive removal of all previously adsorbed components from both adsorption beds, the latter are reconnected and again brought to the adsorption pressure in a final switching phase, which is done first of all preferably with gas from the first expansion step and then with product gas B or with another gas available at the adsorption pressure.

After the pressure has been restored, the two adsorption beds are again available for passing through the above-described process steps from the beginning.

The duration of a switching cycle depends on various conditions. In principle, this duration is neither limited in the upward direction nor in the downward direction in the process of this invention. Adsorption processes are known wherein a switching cycle encompasses only approximately one to two minutes so that the individual switching phases are merely on the order of seconds. Such brief switching times, however, frequently have the consequence that the valves required for the switching-over procedure are subject to relatively rapid wear and must be frequently replaced. Besides, with periods of such a short duration, it is often impossible to obtain a full load on the adsorbents, so that the adsorption beds must necessarily be lengthened. On the other hand, if the switching cycles extend through hours or even days, the adsorption beds often become so large that they are no longer tolerable from an economical viewpoint, especially if appreciable amounts of substances are to be adsorbed from the gases to be treated.

Switching cycles having a duration of 10 minutes up to one hour, preferably 20-25 minutes, have proven to be advantageous for the present invention.

In accordance with a special embodiment of the idea of this invention, an additional phase is interposed between the phase of adsorbing the more readily adsorbable component A from the feed gas mixture and the cocurrent expansion of the two adsorption beds, this additional phase operating at the same pressure as the adsorption phase but wherein, after cutting off the feed gas stream, a gaseous mixture is passed cocurrently to the adsorption through both adsorption beds; this gaseous mixture, with respect to its composition, need merely satisfy the condition that the partial pressure of component A contained therein is equal to or higher than the partial pressure of the same component in the feed gas mixture. In this variant of the process of this invention, an additional loading of the first adsorption bed with component A and a further displacement of component B and optionally additional components from the first adsorption bed are achieved. This subsequent loading or purging is continued until the adsorption front of component A appears at the beginning of the second adsorption bed. The feeding of this gaseous mixture, which can be either product A or another gaseous mixture from the process enriched with A, is interrupted at that time, and the above-described expansion of both adsorption beds is initiated.

This modification in accordance with the invention offers the special advantage that it is thereby possible to usefully exploit the residual gas formed during the first-described modification, which still contains considerable proportions of component A, and to additionally increase the purity and especially the yield of this component significantly.

Consequently, this modification of the process of this invention is particularly expedient in case two-component mixtures are to be separated into their constituents, since the process of this invention makes it possible to obtain these two components in the pure form and in a practically 100% yield.

The process of this invention is conducted preferably in a substantially isothermal manner, i.e. the difference between the temperature of the gas entering the adsorber and that of the gas leaving the adsorber generally does not exceed 10° C., but, because heat is liberated during adsorption and consumed during desorption, the temperatures within the individual adsorption beds between adsorption and desorption fluctuate around a certain median value, but do not vary generally more than 30° C.

If the gaseous mixtures to be separated are those which are in the gaseous phase under normal conditions, the most suitable operating temperature to be considered in this case is room temperature. The process of this invention, however, also makes it possible to process mixtures of substances which are liquid under normal conditions and must be converted into the gaseous phase by heating. In such a case, care must merely be taken to conduct the entire process at a temperature at which all of the constituents are in the gaseous phase.

All of the conventional adsorbents can be utilized in the process of this invention, for example activated carbon, silica gel, molecular sieves such as zeolites, carbon sieves, etc. For the adsorption of CO and $CH_4$, the preferred adsorbent is a zeolitic molecular sieve type 5A.

Although it is the simplest from the viewpoint of process technology to have the entire process take place at essentially the same temperature and to vary only the pressure, there can be special instances requiring modification of the desorption procedure which would include heating of the adsorbents. In this case, it is sufficient to utilize conventional practice for heating and cooling the adsorption beds, such as heating or cooling coils within the adsorbents, heating or cooling jackets around the adsorption beds, and heat exchangers to avoid unneccesary energy losses.

BRIEF DESCRIPTION OF THE DRAWINGS

FIG. 2 is a time-flow diagram of the plant of FIG. 1;

FIGS. 3a and 3b are pressure-time diagrams for the individual adsorbers of the plant of FIG. 1;

FIG. 5 is a time-flow diagram for the plant of FIG. 4; and

FIGS. 6a and 6b are pressure-time diagrams for the individual adsorbers of the plant of FIG. 4.

DETAILED DESCRIPTION OF THE DRAWINGS

Figure 1:
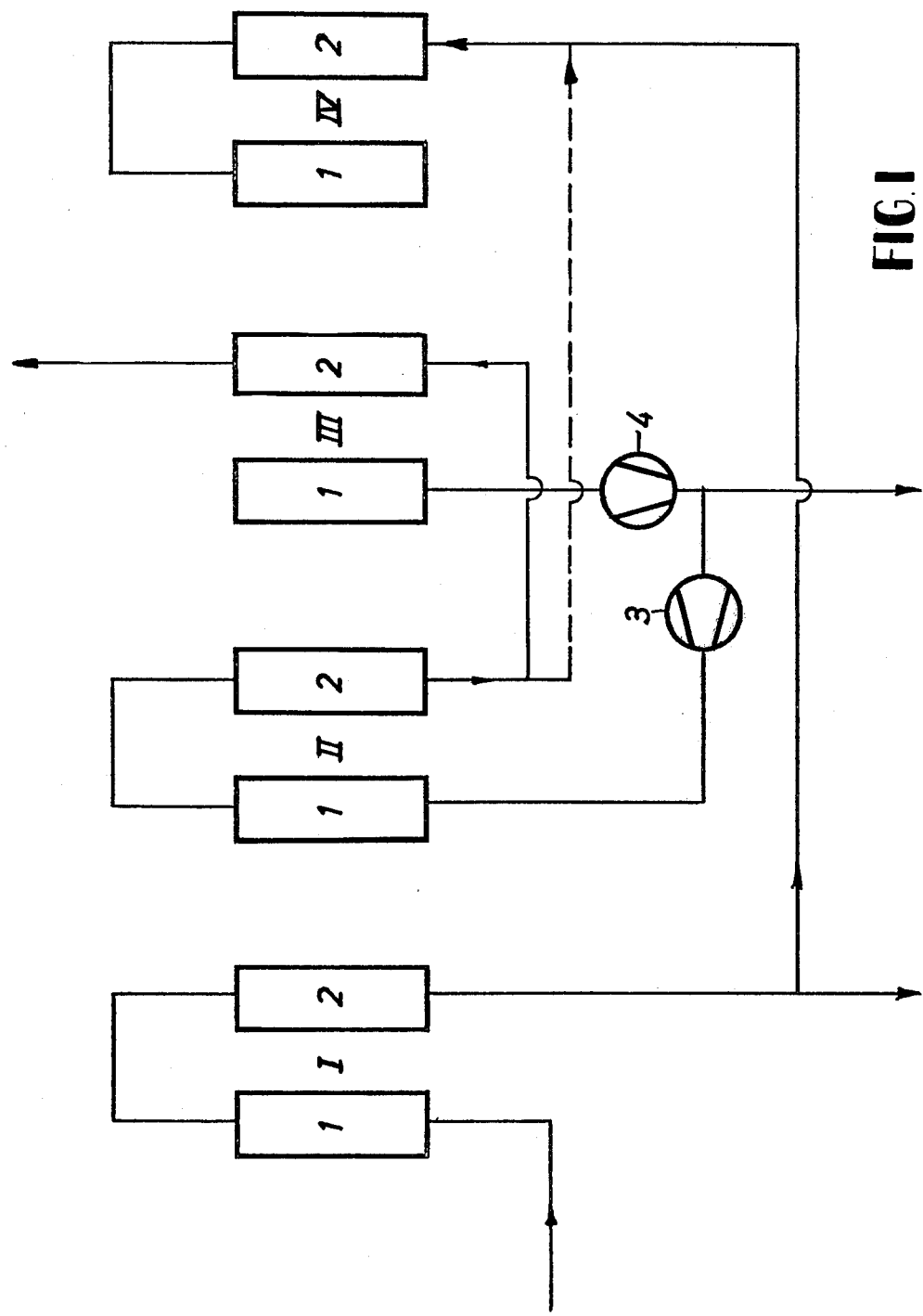
FIG. 1 is a schematic flowsheet of a plant with four pairs of adsorbers.
Figure 4:
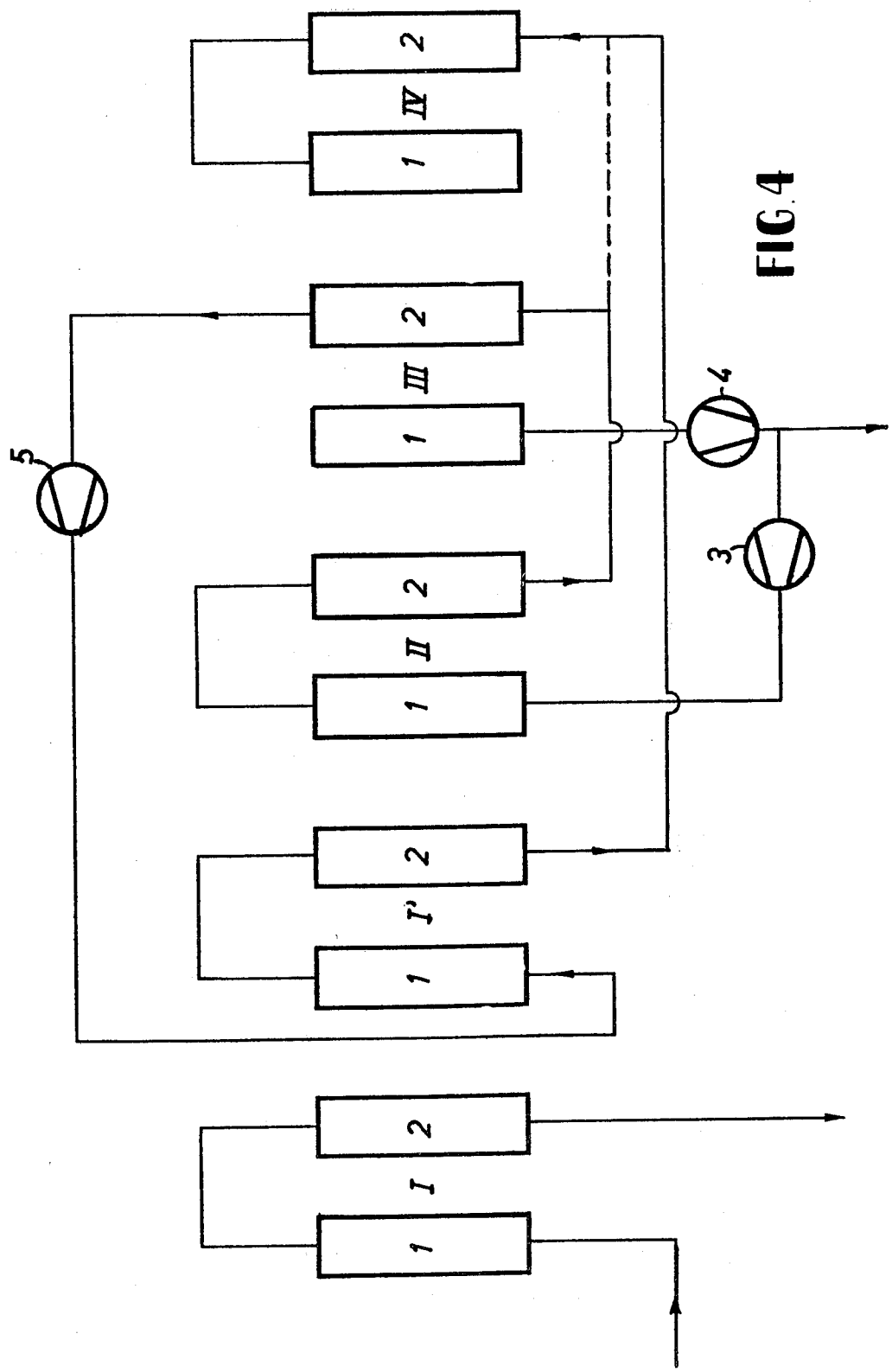
FIG. 4 is a schematic flowsheet of a plant with five pairs of adsorbers.

In FIGS. 1 and 4, for the purposes of clarity, there is illustrated only one of the outlet conduits attached to each adsorber bed. Also, all of the conventional switchover and expansion valves are omitted in order to facilitate comprehension. However, a person skilled in this art, on the basis of the following description of the process, can readily design an actual plant including the conduits and valves necessary for operation.

The process of this invention will be described hereinbelow with reference to a gas produced from a natural gas reforming process. To simplify the description, it is assumed that the gas has previously been freed entirely of $CO_2$ and $H_2O$ by conventional measures, and presently comprises only of $H_2$, CO, and $CH_4$.

FIG. 1 shows four pairs of adsorbers, denoted by I, II, III, and IV; the respectively first and second adsorption beds of each pair are denoted by 1 and 2. The adsorption beds are charged with zeolite 5A.

Under a pressure of 20 bars and at a temperature of 308 K., 17,700 $Nm^3/h$. of feed gas enters the adsorption bed 1 of the adsorber pair I; this feed gas consists of 80% by volume of $H_2$, 17% by volume of CO, and 3% by volume of $CH_4$. In adsorption bed 1, CO and $CH_4$ are adsorbed with preference over $H_2$. The gas, already extensively freed from the lower end of this adsorption bed, product B is discharged in an amount of 14,160 $Nm^3/h$. under a pressure of 19 bars and at a temperature of 308 K., consisting of 99.99% by volume of $H_2$ and 0.01% by volume of $CH_4$. 1,880 $Nm^3/h$. of this product B is branched off and conducted for purposes of pressure buildup into the adsorption beds 2 and 1 of the adsorber pair IV, so that product B is, in the final analysis, available in an amount of 12,280 $Nm^3/h$.

At the same time, the pressure is initially lowered in the adsorption beds 1 and 2 of the adsorber pair II in the adsorption direction to a pressure of about 3.4 bars; during this step, the thus-liberated gas is introduced for purging purposes preferably from the lower end into the adsorption bed 2 of the adsorber pair III. However, it is also possible to utilize a portion of this gas, as indicated by the conduit shown in dashed lines, prior to the introduction of a portion of the product gas into the adsorption bed 2 of the adsorber pair IV, for purposes of building up the pressure in this bed.

Once the desired pressure of 3.4 bars has been attained in the adsorber pair II, a portion of the gas withdrawn from the lower end of the adsorption bed 1 of the adsorber pair III, namely 1,000 $Nm^3/h$., is compressed in compressor 3 to 3.4 bars and introduced under pressure from below into the adsorption bed 1 of the adsorber pair II. The gas consists of 99% by volume of CO, i.e. it has a higher CO partial pressure than the feed gas mixture; as a consequence, a recharging and a displacement of component B from the gas space take place in the adsorption bed 1 of the adsorber pair II, and the adsorption front of the CO and/or $CH_4$ migrates from adsorption bed 1 into adsorption bed 2, while almost pure $H_2$ flows out of the lower end of adsorption bed 2 of the adsorber pair II. The feed of CO to the adsorption bed 1 of the adsorber pair II is interrupted once the adsorption front has approached the end of adsorption bed 2. Thus, after this switching phase, the adsorption bed 1 of the adsorber pair II is fully loaded with CO, whereas the adsorption bed 2 is merely partially loaded therewith.

During this step, the adsorption bed 1 of the adsorber pair III is freed of the components adsorbed therein with the aid of pump 4, which can also be a vacuum pump. Under a pressure of 1 bar and at a temperature of 308 K., 3,000 $Nm^3/h$. of a gas is withdrawn as product A consisting of 99% by volume of CO and 1% by volume of $CH_4$. At the same time, the adsorption bed 2 of the adsorber pair III is regenerated by flushing out the adsorbates contained therein with the aid of the purging gas from the adsorption bed 2 of the adsorber pair II. In this way, 3,420 Nm$^3$/h. of a residual gas is obtained under a pressure of 1 bar and at a temperature of 308 K., consisting of 55% by volume of H$_2$, 30% by volume of CO, and 15% by volume of CH$_4$.

Finally, the adsorption beds 1 and 2 of the adsorber pair IV are again brought to the adsorption pressure as mentioned hereinabove by the introduction of gas from adsorber 2 of the adsorber pair I and/or optionally previously by the introduction of gas from the adsorption bed 2 of the adsorber pair II and, after switchover, are again available as adsorber pair I.

FIG. 2 illustrates these process steps once again with the aid of a time flow diagram. The individual adsorber pairs are represented from the top toward the bottom, and the duration of the individual switching phases is indicated from the left toward the right. A switching cycle lasts, in total, 20 minutes. The entire switching cycle is essentially subdivided into 5-minute phases wherein merely the expansion and purging steps constitute an exception, in that both steps together must be concluded within 5 minutes. The horizontal line in the box "DESORPTION-REGENERATION" mean that, during this procedure, the two adsorption beds 1 and 2 are separated from each other, whereas they are connected together in all other steps.

In the pressure-time diagram according to FIGS. 3a and 3b, the pressures are set forth in bars in the vertical direction and the time is indicated in minutes in the direction toward the right for the individual adsorption beds, in diagrams shown one below the other. As can be seen from the example of adsorber pair I, the system is at the highest pressure during adsorption; this pressure drops greatly during the subsequent expansion, remains the same during purging with CO, and drops once again in adsoprtion bed 1 during the desorption with the aid of the vacuum pump 4, while the regeneration in adsorption bed 2 takes place at a somewhat lower pressure than the step of purging with CO, but this pressure remains essentially the same during the entire regeneration. In the final switching phase, the pressure buildup takes place in both adsorption beds almost up to the adsorption pressure. The pressure curves in the other adsorber pairs proceed analogously, but shifted chronologically with respect to adsorber pair I, so that a more detailed description of these pressure curves is unnecessary.

In FIG. 4, the parts of the plants comparable to those in FIG. 1 are denoted by the same reference numerals. The adsorber pair additionally interposed between the adsorber pairs I and II is denoted by I'. Also in this example, all of the adsorption beds are charged with zeolite 5A.

11,650 Nm$^3$/h. of a gas consisting of 80% by volume of H$_2$, 17% by volume of CO, and 3% by volume of CH$_4$ is introduced into the adsorption bed 1 of the adsorber pair I. This gas is under a pressure of 20 bars and has a temperature of 308 K. After passing through the adsorption bed 1, the gas is introduced into the adsorption bed 2. In the adsorption bed 1, the entire CO of the feed gas and a portion of the CH$_4$ are adsorbed. As product B, 9,650 Nm$^3$/h. of a gas can be withdrawn under a pressure of 19 bars and at a temperature of 308 K. from the outflow end of adsorption bed 2, this product B consisting of 96.6% by volume of H$_2$ and 3.4% by volume of CH$_4$. Once the adsorption front begins to break through in adsorption bed 1, a switchover is effected to the subsequent switching phase.

During this procedure, a purging and/or recharging step is executed in the adsorption bed 1 of the adsorber pair I'. For this purpose, 2,000 Nm$^3$/h. of a gas is introduced from below into the adsorption bed 1 of the adsorber pair I' under a pressure of 20 bars and at a temperature of 308 K., this gas stemming from the upper end of the adsorption bed 2 of the adsorber pair III, having been compressed in compressor 5, and consisting of 63% by volume of H$_2$, 35% by volume of CO, and 2% by volume of CH$_4$. Since the partial pressure of the CO component in this gas is higher than that in the feed gas, an additional loading of the adsorption bed 1 of the adsorber pair I' takes place. This loading is continued until the adsorption front of the CO has entered the adsorption bed 2, but is terminated before this front has reached the end of this adsorption bed. From the end of adsorption bed 2, 1,300 Nm$^3$/h. of hydrogen is discharged, having a few percent of CH$_4$, and is utilized in adsorption beds 2 and 1 of the adsorber pair IV for purposes of pressure buildup.

During the same switching phase, the adsorption beds 1 and 2 of the adsorber pair II are expanded while the first half of the switching phase is taking place; during this period, the gases present in the cavities of the adsorption bed 1 pass over primarily from adsorption bed 1 into adsorption bed 2. Adsorbate likewise passes over to a quite minor proportion, but is readsorbed in the areas of the adsorption bed 2 which are still free.

In the second half of the switching phase, 1,000 Nm$^3$/h. of a gas stemming from the adsorption bed 1 of the adsorber pair III and consisting of 99% by volume of CO and 1% by volume of CH$_4$ is introduced from below into the adsorption bed 1 of the adsorber pair II at 7 bars and 308 K. Thereby, a renewed recharging of this adsorption bed with CO and a displacement of the H$_2$ and/or CH$_4$ take place, ensuing in a further improvement of the purity and yield of this product.

The gas (almost pure H$_2$) exiting from the outflow end of the adsorption bed 2 of the adsorber pair II is conducted, for regenerating this bed, through the adsorption bed 2 of the adsorber pair III from below. The regeneration takes place under a pressure of about 1 bar and leads to an adequate removal of the components previously adsorbed in this bed. A portion of the regenerating gas can be utilized for pressure buildup before the introduction of the pressure gas from the adsorption bed 2 of the adsorber pair I' into the adsorption bed 2 of the adsorber pair IV, in case this appears to be necessary (see the conduit shown in dashed lines). The regenerating gas, loaded with adsorbate, from the upper end of the adsorption bed 2 of the adsorber pair III is compressed to 20 bars in compressor 5 and fed to the adsorber pair I' for the above-described purpose.

At the same time, the adsorption bed 1 of the adsorber pair III is pumped empty with the aid of pump 4, which can also be a vacuum pump. At 1 bar and 308 K., 2,000 Nm$^3$/h. of a gas is obtained as product A which consists of 99% by volume of CO and 1% by volume of CH$_4$.

By means of compressor 3, another 1,000 Nm$^3$/h. of this gas is introduced into the adsorption bed 1 of the adsorber pair II for the above-disclosed purpose.

As described above, the adsorption beds 2 and 1 of the adsorber pair IV are pressurized during this switching phase and are again available for adsorption in the subsequent switching phase in the position of adsorber pair I.

FIG. 5 shows the time flow diagram of the process described with reference to FIG. 4. In this case, the duration of a switching cycle is 25 minutes. The phases of adsorption, purging, expansion, purging, and pressure buildup are always conducted in both adsorption beds. The two beds are separated from each other merely for purposes of desorption and/or regeneration, which is indicated in the illustrated diagram by a horizontal line. Otherwise, the remarks apply as set forth in connection with FIG. 2 in an analogous manner.

Figure 6B:
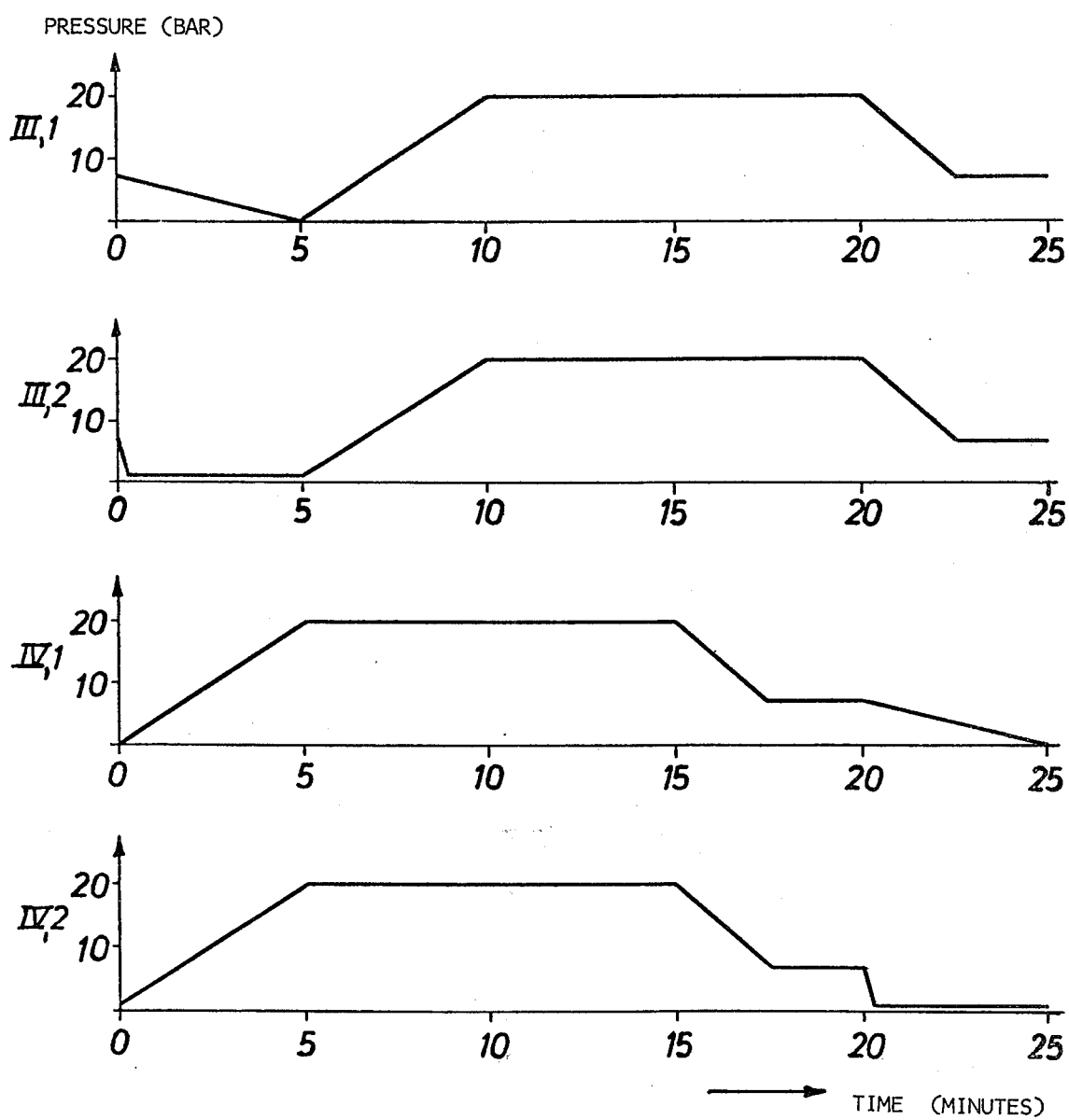

FIGS. 6a and 6b show the pressure-time diagram of the process according to FIG. 4. The pressure is indicated in bars along the ordinate, and the time is set forth along the abscissa in minutes. Here again, the description set forth in connection with FIGS. 3a and 3b applies analogously.

If a gaseous mixture consisting of 80% by volume of $H_2$, 17% by volume of CO and 3% by volume of $CH_4$ were separated in a conventional adsorber plant with e.g. four adsorbers, where no adsorber beds work in series, but only in parallel, it would be possible to enrich e.g. $H_2$ up to 99.99% by volume, but at the same time it would only be possible to enrich CO up to 60% by volume. Likewise it would be possible to enrich CO up to 85% by volume, but this would result in a diminished purity of $H_2$ which would then amount only to 90% by volume.

In contrast to this, according to the present invention it is possible to enrich both components to very high purities. In the embodiment of FIG. 1 the purity of CO amounts to 99% by volume, its yield to 65.8%. The purity of $H_2$ to 99.99% by volume, its yield to 86.7%. In the embodiment of FIG. 4 the purity of CO amounts to 99% by volume and that of $H_2$ to 96.6% by volume, in both cases the yield being 100%.

In the specific embodiments of the invention described above, the adsorption process is conducted at superatmospheric pressures. However, the invention is likewise applicable to processes, where the adsorption takes place at atmospheric pressure and the desorption is performed at subatmospheric pressures.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A selective adsorption process for the separation of gaseous mixtures comprising the steps of:
   (a) passing a feed gas mixture containing components A and B successively at a first pressure through two adsorption beds selective for component A until the evolving adsorption front of component A substantially reaches the outflow end of the first adsorption bed or has only unsubstantially penetrated into the second adsorption bed, discharging an A-free product gas from the outflow end of the second adsorption bed, then interrupting the feeding of the feed gas mixture to the first adsorption bed;
   (b) expanding both adsorption beds in the adsorption direction to a lower pressure sufficient so that proportions of unadsorbed component A emerge from said first adsorption bed, and so that said emerged proportions from the first adsorption bed are adsorbed in the second adsorption bed, and withdrawing an A-free gas from the second adsorption bed;
   (c) at the same pressure as in step (b), conducting a further gaseous mixture in the adsorption direction through both adsorption beds, the partial pressure of component A in said further gaseous mixture being higher than in the feed gas; interrupting the feeding of said further gaseous mixture before the breakthrough of component A through the second adsorption bed, and withdrawing an A-free gas from said second adsorption bed;
   (d) disconnecting both adsorption beds from one another, and expanding the first adsorption bed loaded substantially completely with component A to recover component A; and at the same time expanding the second adsorption bed, partially loaded with component A, in a countercurrent direction to the adsorption process and passing a purge gas in said countercurrent direction through the expanded second adsorption bed to desorb component A; and
   (e) reconnecting both adsorption beds with each other and charging same to said first pressure of step (a).

2. A process according to claim 1, further comprising in between steps (a) and (b), the step of passing another gaseous mixture having a partial pressure of component A higher than in the feed gas mixture cocurrently to step (a) through both adsorption beds until the adsorption front of the component A has completely entered the second adsorption bed, and withdrawing additional B-enriched mixture from the outflow end of the second adsorption bed.

3. A process according to claim 2, wherein the expansion in step (b) is conducted to a pressure corresponding approximately to but not less than the partial pressure of component A in the first adsorption bed of the preceding step.

4. A process according to claim 2, wherein said B-enriched mixture is utilized for the pressure buildup of another set of adsorber.

5. A process according to claim 2, wherein a fraction with component A obtained from a second adsorption bed is utilized as said another gaseous mixture.

6. A process according to claim 1, wherein the expansion in step (b) is conducted to a pressure corresponding approximately to but not less than the partial pressure of component A in the first adsorption bed of step (a).

7. A process according to claim 1, wherein the feed gas contains further components in addition to components A and B, and wherein the A-free gases liberated during steps (b) and (c) comprise said further components.

8. A process according to claim 7, wherein said further components are collected separately from each other based on their rates of desorption.

9. A process according to claim 8, wherein one component is recovered during the expansion in step (b) from the outflow of the second adsorber, and a second component is recovered in step (c) at the outflow of the second adsorber.

10. A process according to claim 1, wherein the A-free gas obtained from step (b) is utilized for the regeneration and/or pressure buildup of another adsorber.

11. A process according to claim 1, wherein the A-free gas obtained from step (c) is utilized for the regeneration and/or pressure buildup of another adsorber.

12. A process according to claim 1, wherein a portion of component A obtained in step (d) from another first adsorption bed in another set of adsorbers is utilized as the further gaseous mixture in step (c).

13. A process according to claim 12, wherein the pressure in step (b) is lowered to 0 to 30% above the partial pressure of component A in the feed gas mixture.

14. A process according to claim 12, wherein the pressure in step (b) is lowered to 0 to 10% above the partial pressure of component A in the feed gas mixture.

15. A process according to claim 1, wherein the pressure buildup according to step (e) takes place in a direction countercurrent to the adsorption direction.

16. A process according to claim 1, wherein in step (a) the adsorption front does not exceed 20% of the total adsorption capacity for component A.

17. A process according to claim 1, wherein in step (a) the adsorption front does not exceed 10% of the total adsorption capacity for component A.

18. A process according to claim 1, wherein said partial pressure of component A in said further gaseous mixture is up to 130% of the partial pressure of component A in the feed gas mixture.

19. A process according to claim 1, wherein said partial pressure of component A in said further gaseous mixture is up to 110% of the partial pressure of component A in the feed gas mixture.

20. A process according to claim 1, wherein said further gaseous mixture in step (c) is conducted through the adsorption beds when the second adsorption bed is 60 to 95% saturated with component A.

21. A process according to claim 1, wherein said further gaseous mixture in step (c) is conducted through the adsorption beds when the second adsorption bed is 80 to 95% saturated with component A.

* * * * *